Jan. 24, 1961  F. P. SPERL  2,969,011
SKEWER UNIT FOR HANDLING AND SERVING FLAMING FOODS
Filed July 28, 1958
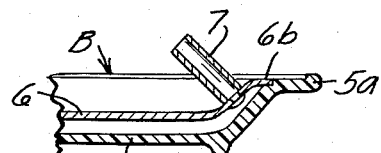
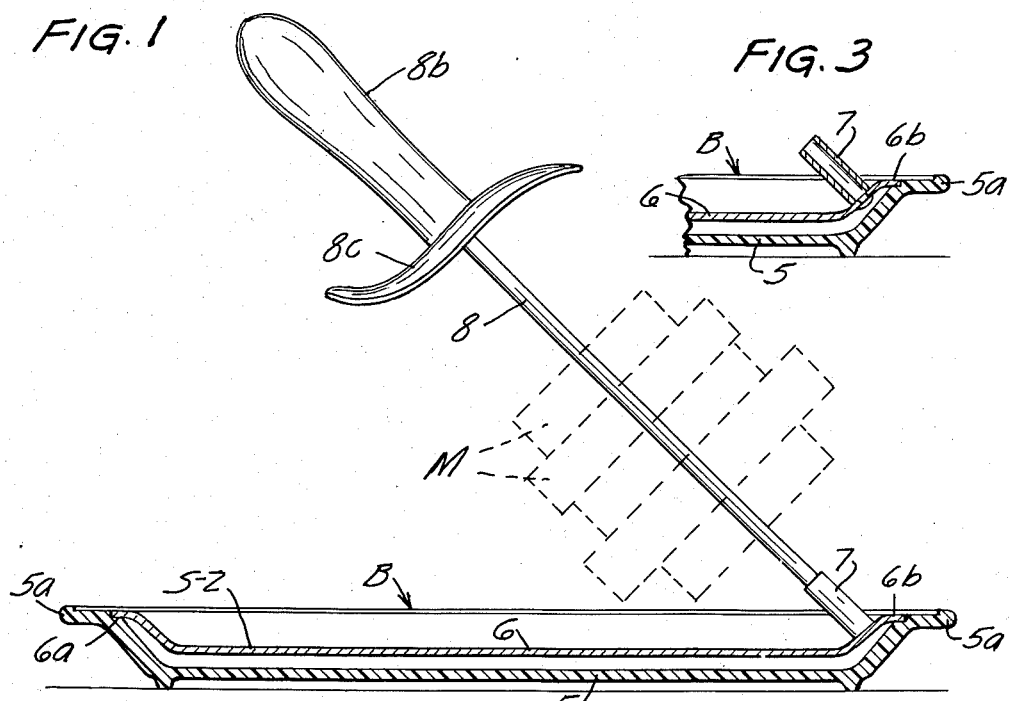
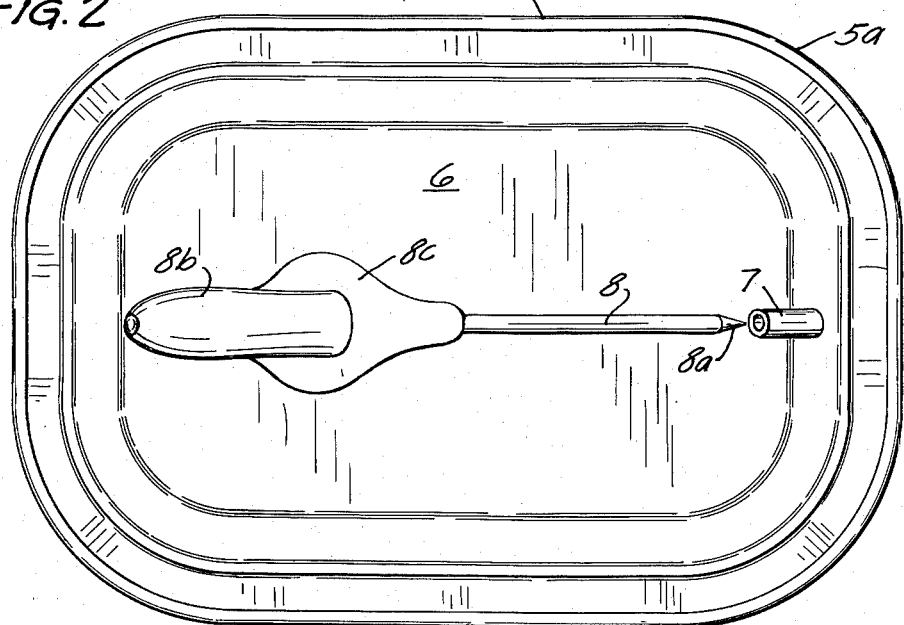
INVENTOR
FERDINAND P. SPERL
BY
Williamson, Schroeder & Palmatier
ATTORNEYS

United States Patent Office 2,969,011
Patented Jan. 24, 1961

2,969,011

SKEWER UNIT FOR HANDLING AND SERVING FLAMING FOODS

Ferdinand P. Sperl, Peoria, Ill., assignor to Service Ideas, Inc., Minneapolis, Minn., a corporation of Minnesota Filed July 28, 1958, Ser. No. 751,562

2 Claims. (Cl. 99—419)

This invention relates to a combination unit for use in restaurants and homes to handle, serve and facilitate eating of flaming foods such as shish-kebab, plum puddings and other foods which are in substantially solid form capable of being impaled upon a skewer or rapier.

Certain solid foods such as lamb chunks or rolls, plum puddings, certain large types of sausage and other meat chunks are frequently served with brandy or alcohol liquids applied to the peripheries thereof in flaming condition. The burning of the alcohol during serving imparts an additional desirable flavor to the food product and also serves to braise or sear the exterior of the product.

At the present time it is the practice in many restaurants to serve flaming shish-kebab and other solid food products in flaming condition by utilizing an elongated skewer resembling in shape, a rapier, with a handle. The waiter or attendant carries the flaming food product with the skewer projected upwardly and when the flames become extinguished through complete consumption of the alcohol or burning fluid, the skewer or in instances, the meat or food product is then deposited upon an ordinary serving plate. Serious danger is encountered in such serving of flaming foods, first from the tendency of the flaming liquid running downwardly to the handle portion of the skewer and thereby burning the hands of the attendant; secondly from the chance of the flaming food dropping off the skewer on the dining table or persons of those dining, through inadvertence or inaccuracy on the part of the waiter or attendant at the time the flaming or hot food product is deposited on an ordinary dish or platter. Frequent and costly accidents have often occurred, both in restaurants and homes and in some instances, fires have been started because of the dripping of flaming liquid or the inadvertent dropping of the flaming food during serving.

It is an object of my invention to provide a simple, highly efficient and safe combination unit for handling, serving and facilitating eating of solid food products which are customarily served in flaming condition through application of an inflammable liquid to the exterior surface of the product. The unit comprises closely cooperating multi-functional components or elements including an elongated skewer or rapier upon which the solid food product is impaled, readily and positively attachable to a combined base-support and dish and so related when the product is served that all drippings will be collected by the dish with support of a skewer in a diagonal and overhanging position to overcome the dangers and objections to the present serving of flaming foods.

A further object is the provision of a unit of the class described wherein radiation of residual heat from a sizzling platter or the like may serve to heat and keep warm, food impaled upon the overhanging skewer; wherein the unit may be constructed to use the skewer as a spit and also for the additional purposes recited and wherein the dish or platter has the additional functions of providing insulated handle elements for transporting the food from kitchen to dining table, with safety to the attendant or waiter and to also act as a wide area supporting base to retain the food product in elevated position and if desired, still flaming, upon a table prior to eating of the food.

These and other objects and advantages of my invention will more fully appear from the following description made in connection with the accompanying drawings wherein like reference characters refer to similar parts throughout the several views and in which:

Fig. 1 is a vertical section taken longitudinally through the combined base and sizzling platter, showing the guarded rapier or elongated skewer in operative, attached positon relative thereto for serving of the food in flaming condition;

Fig. 2 is a top plan view of the same showing the guarded skewer in position just prior to insertion and attachment of the outer end thereof, in the supporting socket of the combined base and platter; and Fig. 3 is a detail section taken longitudinally through the socket and a portion of the adjacent end of the platter.

In the form of the invention illustrated, a combined supporting-base and platter indicated as an entirety by the letter B is provided. The base or platter B as shown, comprises a lower platter or dish 5 of substantial area which is preferably constructed of heat-insulation material such as a filled plastic which will withstand temperatures up to 350 degrees F. The lower dish section 5 has integrally formed or otherwise rigidly secured thereto, outstanding handle flange sections or portions 5a which enable the base to be grasped firmly from at least opposite or end portions thereof without danger of the hands of the attendant being burned from the presence of the associated upper metallic section 6 which is nested and retained as shown in the lower section 5. Section 6 is constructed from rigid metal such as stainless steel or aluminum and may be of substantially similar shape to the lower section 5, but is preferably seated upon a continuous or broken shoulder 6a which is provided on the inner periphery of the dish base section 5, disposed below the upper surface of the handle portions 5a to preferably receive out-turned flange or edge 6b of the upper dish section 6 with the upper surface of the edge or flange disposed below the upper surface of the handle portions 5a.

An obliquely disposed and upwardly extending skewer socket 7 is rigidly affixed to the base support B preferably being welded or otherwise anchored at its lower end to the metallic upper section 6, adjacent one end thereof as shown in the drawings. It will of course be understood that socket 7 may be rigidly attached to intermediate portions of the upper dish section 6 or that two or more of said sockets may be applied, for example one at each end of the metallic upper section. It is important that the longitudinal axis of the socket or sockets 7 extends or extend in vertical planes which lie intermediately and longitudinally or nearly diametrically of the area of the bottom of the upper section 6 of the base-support.

An elongated skewer of rapier form constitutes an essential component of my unit. The skewer has an elongated shank 8 which may be of rod construction, terminating at its outer end in a pointed section 8a and having a cross sectional shape and dimension to snugly interfit for some distance and telescope within the tubular socket 7. The point 8a and a substantial section of the rod adjacent the point is so accommodated and very firmly held when the skewer is mounted in the oblique operative position as shown in Fig. 1. The skewer or rapier 8 has a heat-insulated handle 8b attached to the upper end thereof and a hand guard of considerable area 8c is affixed to the skewer just forwardly of the handle 8b. This guard 8c is preferably of an artistic, ornate shape and of an area and contour as shown in Figs. 1 and 2, to shield the hand of an attendant from flame or heat, as well as from slippage, or sliding of solid food products such as meat during the time the meat or food product M is impaled upon the outer end of the skewer and when the skewer with the meat impaled is attached to the socket in operative position for serving.

In utilizing my device, it is of course possible to use the same skewer 8 with means for connection of its ends for rotation as a spit upon which the meat is actually cooked. This however, is not essential to the principles of the invention.

The solid food product M, upon preparation and cooking of the same, is impaled longitudinally and axially upon the pointed end and intermediate portion of skewer 8, preferably some distance above the pointed end and the skewer is then obliquely disposed and positively secured in the elongated socket 7 as shown. Thereafter with the supporting base B supported from a table, counter or the like, the inflammable liquid may be poured or applied upon the peripheral portion of the food product and then ignited.

The entire unit, with the flaming food may then be safely carried by an attendant through the medium of the insulated handle portions or rim 5a of the lower base unit to a table for serving. The weight of the supporting base B is substantially greater than the combined weight of the skewer 8, handle 8b and the impaled food product and is of comparatively very wide area so that it acts as an efficient supporting base to prevent the rapier with impaled food product and the base from toppling.

The waiter or attendant may safely set the entire unit with the food still flaming, on the dining table and when the flame dies out through combustive consumption of the inflammable fluid, the skewer may be readily detached by an upward oblique pull on handle 8b and the food products may successively or at once be dislodged from the pointed end of the skewer.

During the serving and transportation of the unit, any and all liquids, greases or drippings will be collected by the underlying platter or metallic dish 6 of the base structure. Even if inflammable liquid in flaming condition should run down the skewer and socket 7, no danger is involved since all thereof would be caught by the metallic platter or dish 6.

Assuming that the metallic dish section 6 is intensely heated before serving, the residual heat radiated therefrom will continue to warm and heat portions of the food product which still remain upon the obliquely disposed and supported skewer.

It will also be apparent that where a number of separate independent pieces of meat or other solid food chunks are impaled upon the skewer 8, that the same may be successively removed from the skewer and eaten by the consumer. The disposition of the skewer relative to the platter or base unit leaves a very substantial portion of the platter exposed upon which the food product may be cut and eaten with a fork or spoon.

From the foregoing description it will be seen that I have invented and provided a simplified but highly efficient combination unit of the class described which overcomes the previous dangers and objections to the handling and serving of flaming or very hot foods or food assemblies. When not in use, the rapier or elongated skewer may be detached and compactly nested within the confines generally, of the supporting-base or platter, for shipment or compact storage.

It will of course be understood that various changes may be made in the form, details, arrangement and proportions of the parts without departing from the scope of the invention.

What is claimed is:

1. A unit for handling, serving and facilitating eating of flaming foods comprising a dished base having a bottom section of rigid heat-resisting material and having an upper dished section constructed of metal for being heated to a high temperature, an open ended retaining socket secured to the metal section of said base adjacent one end thereof and extending upwardly, obliquely and in overhanging relation to said base and an elongated metal skewer having a guarded handle at one end thereof and having its opposite end pointed for facilitating the impaling of solid food thereon, said point being detachably, telescopically and snugly seated within said socket to support said skewer in oblique overhanging relation to said base whereby any drippings from the impaled food will be collected in the metal upper section of said base, and said base being substantially heavier than the combined weight of said skewer and the food impaled thereon.

2. A unit for handling and serving flaming foods comprising a platter having an out-turned, heat-insulated handle means at peripheral portions thereof, a retaining socket secured to said platter adjacent one end thereof and extending upwardly and in overhanging relation to the bottom of said platter, an elongated skewer element having a handle and protective shield therefor at one end thereof and terminating at its other end in a point upon which foods in solid form may be impaled said point being detachably, telescopically, and snugly seated in said socket in supported relationship therewith, said skewer in use with flaming foods impaled thereon overhanging said platter whereby any drippings from said food will be collected by said platter and whereby radiant heat emanating from said hot platter will heat said foods, the weight of said platter being substantially greater than the weight of said skewer with the solid foods impaled thereon whereby said platter acts as a wide area base for supporting said skewer without danger of toppling of the combined unit.

References Cited in the file of this patent

UNITED STATES PATENTS

| 1,902,208 | Back et al. | Mar. 21, 1933 |
| 2,245,220 | Nelson | June 10, 1941 |
| 2,720,158 | Finizie | Oct. 11, 1955 |

FOREIGN PATENTS

| 155,715 | Great Britain | Dec. 30, 1920 |